United States Patent [19]

Iacoviello

[11] Patent Number: 4,735,986

[45] Date of Patent: Apr. 5, 1988

[54] VINYL ACETATE/ETHYLENE COPOLYMER EMULSIONS USEFUL AS CARPET ADHESIVES

[75] Inventor: John G. Iacoviello, Allentown, Pa.

[73] Assignee: Air Products and Chemicals, Inc., Allentown, Pa.

[21] Appl. No.: 63,603

[22] Filed: Jun. 18, 1987

Related U.S. Application Data

[63] Continuation of Ser. No. 762,097, Aug. 2, 1985, abandoned.

[51] Int. Cl.$^4$ .................................................. C08K 3/26
[52] U.S. Cl. ................................. 524/427; 524/458; 524/459; 524/503; 526/202
[58] Field of Search ............... 524/427, 458, 459, 503; 526/202

[56] References Cited

U.S. PATENT DOCUMENTS

| | | | |
|---|---|---|---|
| 3,530,080 | 9/1970 | Inskip | 524/503 |
| 3,661,696 | 5/1972 | Knutson | 161/204 |
| 3,692,723 | 9/1972 | Kasagi et al. | 260/29.6 E |
| 3,716,504 | 2/1973 | Lindeman et al. | 524/503 |
| 3,734,819 | 5/1973 | Knutson | 161/254 |
| 3,769,151 | 10/1973 | Knutson et al. | 161/204 |
| 3,816,362 | 6/1974 | Tsuchihara et al. | 260/174 |
| 3,827,996 | 8/1974 | Beresniewicz | 260/29.66 B |
| 3,830,761 | 8/1974 | Lenney | 524/459 |
| 3,844,990 | 10/1974 | Lindemann et al. | 526/202 |
| 4,043,961 | 8/1977 | Beresniewicz et al. | 260/29.6 WA |
| 4,189,415 | 2/1980 | Eck et al. | 524/503 |
| 4,239,563 | 12/1980 | Iacoviello | 156/72 |
| 4,267,090 | 5/1981 | Heimberg et al. | 260/29.6 R |
| 4,287,329 | 9/1981 | Heimberg | 526/331 |
| 4,332,850 | 6/1982 | Iacoviello | 428/288 |
| 4,521,561 | 6/1985 | Hausman et al. | 524/459 |
| 4,528,315 | 7/1985 | Eck et al. | 526/202 |

Primary Examiner—Joseph L. Schutter
Assistant Examiner—J. M. Reddick
Attorney, Agent, or Firm—Michael Leach; William F. Marsh; James C. Simmons

[57] ABSTRACT

A vinyl acetate-ethylene copolymer emulsion comprising an aqueous colloidal dispersion of a copolymer containing 65 to 90 wt % vinyl acetate and 10 to 35 wt % ethylene prepared by the emulsion polymerization of the monomers in the presence of a stabilizing system consisting essentially of an 86 to 90 mole % partially hydrolyzed polyvinyl alcohol, a 98 to 99+ mole % fully hydrolyzed polyvinyl alcohol, in a partially hydrolyzed polyvinyl alcohol:fully hydrolyzed polyvinyl alcohol weight ratio from 3:1 to 1:3, and a nonionic polyalkoxylated surfactant.

Also disclosed is a carpet backing adhesive composition comprising such a vinyl acetate-ethylene copolymer emulsion, about 0.1 to 3 parts by weight dispersant, about 0.1 to 10 parts by weight thickening agent and between 300 and about 1000 parts by weight filler, all of the components being per 100 parts of the copolymer.

12 Claims, No Drawings

VINYL ACETATE/ETHYLENE COPOLYMER EMULSIONS USEFUL AS CARPET ADHESIVES

This is a continuation of application Ser. No. 762,097, filed Aug. 2, 1985, now abandoned.

TECHNICAL FIELD

The invention relates to vinyl acetate-ethylene copolymer emulsions and, more particularly, it relates to such copolymer emulsions as a component of adhesives for use with rugs and carpets.

BACKGROUND OF THE INVENTION

A vinyl acetate-ethylene copolymer emulsion stabilized with polyvinyl alcohol has been used by the carpet industry as an adhesive for tufted carpet manufacture since about 1970. Such copolymer had a Tg in the range of −15° to −18° C. and contained 5% polyvinyl alcohol based on vinyl acetate. The polyvinyl alcohol stabilizer system comprised a mixture of low viscosity partially hydrolyzed polyvinyl alcohol and medium viscosity partially hydrolyzed polyvinyl alcohol. The emulsion was about 52% solids and had a Brookfield viscosity of 500 cps. The emulsion demonstrated adequate performance in the carpet backing application although the water resistance was less than desired.

With the advent of newer, modern methods of carpet backing manufacture, including higher calcium carbonate loadings and frothing the adhesive compound, the vinyl acetate-ethylene copolymer emulsion was becoming an obsolete product. The emulsion could not be compounded to the higher calcium carbonate loadings and was not compatible with all grades of calcium carbonate nor with styrene-butadiene emulsions.

U.S. Pat. No. 4,239,563 discloses such vinyl acetate-ethylene copolymer emulsions having a Tg between about −35° C. and about −10° C. as laminating adhesives for rugs and carpets. The amount of vinyl acetate in the copolymer of the emulsion is between about 20 and 70 parts by weight and the corresponding amount of ethylene in the copolymer is between 30 and about 80 parts by weight. The copolymer emulsions can be prepared with or without surfactants. When polyvinyl alcohol is used as a protective colloid during the polymerization, it is not necessary to add a surfactant. If such a protective colloid is not employed, a surfactant such as a nonionic or anionic surfactant can be employed.

Prior art regarding vinyl acetate-ethylene copolymer emulsions prepared in the presence of polyvinyl alcohol includes the following:

U.S. Pat. No. 3,661,696 discloses a process for the production of an aqueous emulsion of an ethylene-vinyl acetate copolymer wherein the polymerization is performed in the presence of a preformed seed emulsion and a minor amount, from 1.5 to 6 wt %, of a protective colloid comprising a mixture of fully and partially hydrolyzed polyvinyl acetate. The resulting emulsion can be used as an adhesive. In Example 9 several emulsion compositions were prepared using the polyvinyl alcohol mixture in combination with a nonionic surfactant. In U.S. Pat. Nos. 3,734,819 and 3,769,151 a similar process is disclosed in which the ethylene-vinyl acetate polymer is prepared in the presence also of a small amount of a vinyl sulfonic acid comonomer or an unsaturated $C_3$–$C_6$ acid, respectively. Similarly, these patents show emulsion compositions prepared using a seed emulsion, the polyvinyl alcohol mixture and a nonionic surfactant.

U.S. Pat. No. 3,692,723 discloses aqueous dispersions and heat melting adhesives comprising same, which dispersions contain a copolymer of ethylene and vinyl acetate wherein the ethylene content is from 30 to 98 wt %, the copolymer having been prepared by a copolymerization process utilizing a particular combination of nonionic emulsifier, anionic emulsifier and protective colloid.

U.S. Pat. No. 3,816,362 discloses a process for preparing a stable aqueous ethylene-vinyl ester copolymer emulsion having an ethylene content of 4 to 20 wt %. Example 1 shows the use of a polyvinyl alcohol, a polyoxyethylene nonylphenyl ether (nonionic surfactant) and sodium dodecyl benzene sulfonate (anionic surfactant).

U.S. Pat. No. 3,827,996 discloses aqueous dispersions of vinyl ester polymers containing as a protective colloid partially hydrolyzed polyvinyl alcohol having an average vinyl acetate content of 5 to 7 mole %. The polyvinyl alcohol may consist of a blend of two or more polyvinyl alcohols, each of which has an average vinyl acetate content different from the average of the blend. Several examples show the use of a partially hydrolyzed and a fully hydrolyzed polyvinyl alcohol in combination with a nonionic surfactant in the preparation of vinyl acetate-ethylene copolymer emulsions.

U.S. Pat. No. 4,043,961 discloses adhesive compositions consisting essentially of an aqueous emulsion of vinyl acetate-ethylene copolymer prepared in the presence of protective colloid comprising fully hydrolyzed vinyl alcohol copolymer containing methyl methacrylate. The examples show the use of such vinyl alcohol copolymer in combination with a medium and/or low viscosity partially hydrolyzed polyvinyl alcohol and a nonionic surfactant.

U.S. Pat. Nos. 4,267,090 and 4,287,329 disclose the preparation of vinyl acetate-ethylene copolymer emulsions in a reaction medium containing a protective colloid and a surface active agent.

U.S. Pat. No. 4,521,561 discloses the preparation of vinyl acetate-ethylene copolymer emulsions exhibiting both partially- and fully-hydrolyzed polyvinyl alcohol compatibility prepared in the presence of a polyvinyl alcohol stabilizing system having an 8 to 10 mole % residual vinyl acetate content.

SUMMARY OF THE INVENTION

The present invention provides an aqueous dispersion of vinyl acetate-ethylene copolymers of 40 to 70 wt % solids which are prepared in the presence of a low level of both partially and fully hydrolyzed polyvinyl alcohols and, in addition, a low level of nonionic surfactant. Such vinyl acetate-ethylene copolymer emulsions are very useful as a carpet backing adhesive.

The aqueous emulsion, or colloidal dispersion, comprises a vinyl acetate-ethylene copolymer dispersed in an aqueous medium which is prepared by the emulsion copolymerization of vinyl acetate and ethylene monomers in the presence of about 4 to 8 wt %, based on vinyl acetate monomer, of a stabilizing system consisting essentially of a partially hydrolyzed polyvinyl alcohol, a fully hydrolyzed polyvinyl alcohol and a nonionic polyalkoxylated surfactant. The preferred polyvinyl alcohol component of the stabilizing system consists essentially of a fully (at least 98 mol %) hydrolyzed polyvinyl alcohol and a partially (86 to 90 mol %) hydrolyzed polyvinyl alcohol in a weight ratio of fully hydrolyzed polyvinyl alcohol to partially hydrolyze polyvinyl alcohol ranging from 3:1 to 1:3. The nonionic polyalkoxylated surfactant component of the stabilizing system may comprise an oxyalkylated product of an alkyl phenol, an aliphatic alcohol, an aliphatic carboxylic acid, or an acetylenic glycol or block copolymers of ethylene oxide and propylene oxide.

Another embodiment of the invention is an adhesive polymeric composition for adhering fibers or a pile material to a carpet or rug backing substrate comprising a vinyl acetate-ethylene copolymer emulsion of the invention, about 0.1 to 3 parts by weight dispersant, about 0.1 to 10 parts by weight thickening agent, and between 300 and about 1000 parts by weight filler, all parts by weight are per hundred parts of the copolymer.

The vinyl acetate-ethylene copolymer emulsions most advantageously can be compounded with filler to provide an adhesive composition of high coatings solids of about 80% up to about 85% or more.

Additionally, the emulsions are compatible with most commercially available grades of calcium carbonate filler and are also compatible with most styrene-butadiene emulsions.

The emulsions which can be prepared at high emulsion solids of 65 to 70 wt % demonstrate good coating viscosity stability and improved water resistant properties.

The adhesive compositions containing the emulsions possess better strength (tuft lock and T-peel) at comparable hand compared to the prior art vinyl acetate-ethylene copolymer-based rug backing adhesives.

DETAILED DESCRIPTION OF THE INVENTION

The copolymers use in the present invention comprise 65 to 90 wt % vinyl acetate and 10 to 35 wt % ethylene, on a monomer basis, to provide a Tg ranging from about −20° to 10° C., preferably 85 to 90 wt % vinyl acetate and 10 to 15 wt % ethylene and may optionally include minor amounts, i.e. to about 5 wt %, of one or more other monomers which are copolymerizable with vinyl acetate and ethylene. Exemplary of a monomer which can be added is maleic acid in an amount to about 1 wt %. Preferably the emulsions are greater than about 60% solids and most desirably about 65% solids or more.

Contemplated as the functional, or operative, equivalents of vinyl acetate in the copolymer emulsions are vinyl esters of $C_1$–$C_{18}$ alkanoic acids, such as vinyl formate, vinyl propionate, vinyl laurate and the like.

The amount of the stabilizing system used in the polymerization reaction is about 4 to 8% based on the weight of vinyl acetate monomer. The stabilizing system preferably is added to the polymerization reaction medium all at once prior to initiation, or may be added incrementally during the course of the polymerization, provided a sufficient amount is present initially to provide emulsion stability.

The stabilizing system which is used in the polymerization recipe to prepare the carpet adhesive emulsion consists essentially of a mixture of a 98 to 99+ mole % hydrolyzed (fully) polyvinyl alcohol and an 86 to 90 mole % hydrolyzed (partially) polyvinyl alcohol, preferably 86 to 88 mole % hydrolyzed, and a nonionic polyalkoxylated surfactant. The fully and partially hydrolyzed polyvinyl alcohols should have a degree of polymerization ranging from 100 to 600, although small amounts of polyvinyl alcohol having a higher degree of polymerization can also be present.

The amount of the polyvinyl alcohol component of the stabilizing system used in the polymerization reaction is about 3 to 5 wt % based on vinyl acetate monomer. The relative amount of each type of polyvinyl alcohol that is used is in the range of 3:1 to 1:3 wt ratio of fully hydrolyzed polyvinyl alcohol to partially hydrolyzed polyvinyl alcohol, desirably at a 1:1 wt ratio.

In addition to the polyvinyl alcohol component the stabilizing system according to the invention also contains a nonionic polyoxyalkylene condensate surfactant (polyalkoxylated surfactant) in an amount ranging from 1 to 3 wt % based on vinyl acetate.

The polyalkoxylated surfactants have repeating alkylene oxide units represented by (alkylene oxide)$_n$. The preferred polyethoxylated and polypropoxylated surfactants have at least a portion of their structure represented by the following general formula:

wherein R is methyl or hydrogen and n represents the number of moles of alkylene oxide. Polyethoxylated substances are preferred.

Among the nonionic surfactants which have been found to provide good results are included the Igepal surfactants marketed by GAF Corp., and the Pluronic surfactants marketed by BASF Wyandotte. The Igepal surfactants are members of a homologous series of alkylphenoxy poly(ethyleneoxy) ethanols which can be represented by the general formula:

wherein $R^1$ represents an alkyl radical, Ph represents a phenylene radical and n represents the number of moles of ethylene oxide employed, among which are alkylphenoxy poly(ethyleneoxy) ethanols having alkyl groups containing from about 7 to about 18 carbon atoms, inclusive, and having from about 4 to about 100 ethyleneoxy units, such as the heptylphenoxy poly(ethyleneoxy) ethanols, nonylphenoxy poly(ethyleneoxy) ethanols and dodecylphenoxy poly(ethyleneoxy) ethanols; alkyl poly(ethyleneoxy) ethanols; and alkyl poly(propyleneoxy) ethanols. The Pluronic surfactants are condensates of ethylene oxide with a hydrophobic base formed by condensing propylene oxide with propylene glycol, and the like.

Suitable nonionic surfactants would also include the Tween surfactants marketed by Atlas Chemical which are polyoxyalkylene derivatives of hexitol (including sorbitans, sorbides, mannitans and mannides) anhydride partial long-chain fatty acid esters, such as polyoxyalkylene derivatives of sorbitan monolaurate, sorbitan monopalmitate, sorbitan monostearate, sorbitan tristearate, sorbitan monooleate and sorbitan trioleate. Other suitable nonionic surfactants which can be employed are ethylene oxide derivatives of long chain fatty alcohols such as octyl, dodecyl, lauryl or cetyl alcohol and ethylene oxide adducts of acetylenic glycols marketed by Air Products and Chemicals, Inc. under the registered trademark "Surfynol".

Various free-radical forming sources can be used in carrying out the polymerization of the monomers, such as peroxide compounds. Combination-type systems employing both reducing agents and oxidizing agents, i.e. a redox system, can also be used. Suitable reducing agents include bisulfites, sulfoxylates, or other compounds having reducing properties such as ascorbic acid, its enantiomer erythorbic acid and other reducing sugars. The oxidizing agents include hydrogen peroxide, organic peroxides such as t-butyl hydroperoxide and the like, persulfates, such as ammonium or potassium persulfate, and the like. Specific redox systems which can be used include hydrogen peroxide and zinc formaldehyde sulfoxylate; hydrogen peroxide, ammonium persulfate or potassium persulfate with sodium metabisulfite, sodium bisulfite, ferrous sulfate, zinc formaldehyde sulfoxylate or sodium formaldehyde sulfoxylate; and the much preferred hydrogen peroxide and ascorbic acid or erythorbic acid combination which enhances water resistance and avoids the introduction of formaldehyde to the emulsion as results from zinc or sodium formaldehyde sulfoxylate.

The oxidizing agent is generally employed in an amount of 0.01 to 1.0%, preferably 0.05 to 0.5% based on the weight of vinyl acetate introduced into the polymerization system. The reducing agent is ordinarily added in an aqueous solution in the necessary equivalent amount.

The preferred method for producing the vinyl acetate-ethylene copolymer emulsions comprises the following "cold initiation" process:

(a) forming an aqueous emulsion reaction mixture comprising the stabilizing system and the vinyl acetate monomer in a suitable pressure reactor, (b) pressurizing the reactor with ethylene to an ethylene-equilibrium pressure suitable for providing the copolymer with the desired ethylene content, (c) initiating the reaction mixture by the addition of a free radical source at a temperature from about 10° to 40° C. and bringing the reaction mixture to a reaction temperature of from 45° to 85° C. within a period of not more than 2 hours with the reaction temperature exceeding the initiation temperature by at least 15° C., and (d) continuing polymerization of the reaction mixture until the vinyl acetate content as free monomer in the reaction mixture is reduced below about 1 wt %.

The reaction rate and temperature can be controlled by the rate of free radical source, e.g. redox system, addition and by the rate of heat dissipation. Generally, it is advantageous to maintain a mean temperature of about 55° C. during the polymerization of the monomers.

Typically the polymerization is initiated by introducing initial amounts of the oxidant, the reductant having been added with the initial charge. After polymerization has started, additional oxidant and reductant are incrementally added as required to continue polymerization. Any third copolymerizable monomer may be batched or may be added as separate delays with the remaining vinyl acetate, if any.

When reference is made to incremental addition, whether of monomer or redox system, substantially uniform continuous or intermittent additions, both with respect to quantity and time are contemplated. Such additions are also referred to as "delay" additions.

The reaction time will depend upon variables such as the temperature, the free radical forming source and the desired extent of polymerization. It is generally desirable to continue with the reaction until less than 0.5% of the vinyl acetate monomer remains unreacted.

More specifically, the polymerization method for preparing the vinyl acetate-ethylene copolymers utilizes a "cold initiation" process. The first step, as with most other aqueous emulsion processes, lies in the formation of an aqueous emulsion of vinyl acetate and other components used in the reaction mixture. In this regard, water is first mixed with the stabilizing system described above. Other components, for example, buffers may be added as needed to form a premix. The premix is then charged to the reactor and the vinyl acetate added. Optionally, the vinyl acetate can be added to the premix. At least 75% and preferably the entire amount of the vinyl acetate monomer is added prior to initiation. Then the oxidizing agent of the redox initiator system is added to the reactor.

The reactor is initially pressurized with ethylene to provide a minimum ethylene equilibrium pressure from about 100 to 1000 psig. This pressure may generally be less than the operating pressure. Agitation is effected during pressurization and typically ethylene is introduced by subsurface means through spargers to ensure that ethylene is rapidly transferred to the vinyl acetate.

Prior to initiation the reaction mixture is adjusted to a temperature from about 10° to 40° C., preferably about 25° to 35° C. Pressurization of the reaction mixture with ethylene may be prior to or subsequent to this adjustment step. Typically, for commercial reactions, this will be from 400 to 750 psig. After the reaction mixture is brought to the initiation temperature, and the ethylene is present in the vinyl acetate monomer droplets, polymerization of the reaction mixture is commenced by the addition of the reducing component of the redox system. The low Tg, −20° to 10° C., copolymers can be prepared by adding some ethylene during the reaction or toward the end of the reaction. The amount of ethylene required at the end will depend upon how much ethylene is added in the initial charge and the free space in the reactor.

On initiation, the temperature of the reaction mixture begins to rise and on continued addition of reducing agent the temperature will increase rapidly. Reducing agent addition is adjusted to reach a reaction temperature of about 45° to 85° C., typically 50° to 60° C., ideally about 55° C., about 2 hours, preferably within one hour, and most desirably within thirty minutes, and then it is added at a rate to maintain such temperature. The reaction temperature is set to be at least 15° C., preferably at least 20° C., above the initiation temperature. As a result of the temperature increase the ethylene pressure will increase correspondingly.

Once the reaction temperature rises about 1° C. upon initiation, the remaining vinyl acetate monomer, if any, and any comonomers are added in a delay mode. Such a delay addition is desirable in view of the difference in polymerization rates of many of the various monomers. So it is preferable to delay the addition of those monomers having a fast polymerization rate into the polymerization medium.

It is not necessary to use seed emulsion polymerization techniques to obtain the emulsions used in the invention. Seed emulsion polymerization may be detrimental to the properties of the adhesive emulsion products.

The carpet backing adhesive compositions containing the copolymer emulsions also generally contain thickening agents, dispersants, and fillers which are customarily used in the art. Where the adhesive compositions are frothed for application, foaming aids and foam stabilizers would be included in the composition.

Conventional thickening agents such as sodium polyacrylates and hydroxyethyl cellulose can be employed in an amount between about 0.1 and 10 parts per hundred parts of copolymer. A dispersant, or deflocculating agent, such as tetrasodium pyrophosphate or low molecular weight polyacrylates, can be employed in an amount of about 0.1 to 3 parts by weight per hundred parts of copolymer.

In addition, conventional fillers such as hydrosilicates of alumina, titanium dioxide, aluminum hydroxide, preferably calcium carbonate, and barium sulfate can be employed in an amount between 300, preferably 400, and about 1000 parts by weight per hundred parts copolymer. Since the copolymer emulsions of the present invention can be loaded to an exceptionally high filler level, in excess of 400 parts by weight per hundred parts of copolymer, a significant economic advantage can be obtained using relatively large amounts of inexpensive filler in the copolymer emulsion adhesive compositions.

Minor amounts of other conventional additives such as stabilizers, pigments and defoamers can also be included in the adhesive compositions.

Conventional application techniques can be employed, i.e. the same application techniques employed for styrene-butadiene rubber adhesives. The adhesive compositions can be applied to the underside of the pile fiber primary substrate composite by means of a kiss-roller, the use of which is common in conventional carpet backing processes to coat or impregnate the jute fibers of the primary substrate and wipe off the excess emulsion. Other suitable methods of application can, of course, be used such as spreading with a roll, a doctor blade, spraying, etc. The amount of latex applied is normally just sufficient to obtain adequate adhesion of the pile fibers to the primary substrate and obtain sufficient bundle wrap. Excess emulsion material can be used but is wasteful and necessitates longer drying times by infra-red lamps or hot air ovens or a combination of both. Conventional coating weights on carpets can be used. Typically, the coating weights will vary from about 17 to 37 ounces per square yard. The method of applying rug backing compositions to various types of carpeting material can vary from company to company. Some companies prefer to use a rug backing composition with a working viscosity of 8,000 to 15,000 cps. The filler levels will also normally vary from company to company.

The vinyl acetate-ethylene copolymers prepared in accordance with the present invention can be applied to carpets made from any of the usual fibers, such as nylons, acrylates, polyesters and wool, and can be used with all normal backing materials, including jute and polypropylene. The vinyl acetate-ethylene copolymer emulsions are advantageously laminating adhesives for indoor-outdoor carpeting made from polypropylene.

Some of the important characteristics of laminating adhesives are determined by the T-peel, tuft lock and pill tests.

T-peel is a value obtained when the secondary backing is pulled away from the primary backing and is determined by using a Scott tester or Instron tester. Adhesion of the scrim, or secondary backing, through the primary substrate is referred to as the "peel strength". This term is used in its normal sense in the carpet manufacturing industry to mean the force required to peel apart a strip of the two adhered components 3 inches wide which have been aged 24 hours. It is measured by gripping one of the components in each jaw of the Scott tensile tester and then moving the jaws apart at a rate of 3 inches per minute. A value of between 2.5 and 6 pounds is normally obtained. Normally, the lighter the coating weight the lower the T-peel.

Tuft lock is a determination of the ability of a rug backing composition to hold fiber to both the primary and secondary backing. Tuft lock is determined by using a Scott tester or Instron tester to pull a single span of pile yarn and measuring the force required to pull the fiber away from the structure. Normally, values for styrene-butadiene rubber emulsions will vary from 4 to 10 pounds of pull.

Additional information with respect to the manufacture of rugs and carpets using backing adhesive compositions can be found in U.S. Pat. No. 4,239,563 which disclosure is incorporated by reference.

EXAMPLE

The described procedure is the preferred method for preparing the vinyl acetate-ethylene (VAE) copolymer emulsions used in the invention.

The following ingredients were added to a 30 gallon pressure kettle:

| | |
|---|---|
| Water | 12,500 g |
| Vinol 205$^a$ (20% soln.) | 4,800 g |
| Vinol 107$^a$ (20% soln.) | 4,800 g |
| Igepal CO-887$^b$ | 1,600 g |

$^a$Polyvinyl alcohols marketed by Air Products and Chemicals, Inc. See Table 1.
$^b$Nonionic surfactant marketed by GAF Corp. See Table 1. 70% aqueous solution of Igepal CO-880 surfactant After mixing the above ingredients, 4 g ferrous sulfate in 4,674 g water were added and mixed. Then 60 g phosphoric acid in 400 g water were added yielding a reaction medium having a pH of 3.2. To this polymerization reaction medium was added 54480 g vinyl acetate monomer.

The reaction vessel was agitated at 350 rpm and the reaction temperature brought to 35° C. Ethylene was added to a pressure of 500 psig. Next, 150 g of a 4% erythorbic acid solution were added to the polymerization reactor. The erythorbic acid solution was prepared from the following ingredients:

| | |
|---|---|
| Water | 3092 g |
| Erythorbic acid | 130 g |
| Ammonium Hydroxide (29%) | 28 g |

The polymerization reaction was initiated with 20 g of a 2% hydrogen peroxide solution prepared from the following ingredients:

| | |
|---|---|
| Water | 3300 g |
| Hydrogen peroxide (35%) | 200 g |

Upon initiation, the remainder of the erythorbic acid solution was added over a 4 hour period. The remainder of the hydrogen peroxide solution was also added over the 4 hour period with the exception that the hydrogen peroxide solution was added in a manner to control the polymerization temperature at 55° C. with a reaction vessel jacket temperature of 30° C. The reactor temperature was allowed to rise from the initial temperature of 35° C. to 55° C. over a period of approximately 1 hour.

At the end of the first hour of polymerization the reactor pressure was raised to 750 psig and maintained at this pressure with ethylene make-up until the vinyl acetate free monomer content was about 7%. Ethylene make-up was then discontinued and the reactor pressure allowed to decay. At the end of 4 hours of polymerization, the vinyl acetate free monomer content was approximately 1.5%. The emulsion was cooled to 35° C. and transferred to a degasser. The vinyl acetate free monomer content was reduced below 0.5% by the simultaneous addition over a 1 hour time period of 2100 g of an 8% t-butyl hydroperoxide solution and 2520 g of a 10% erythorbic acid solution. The pH of the emulsion was adjusted to 8 with 766 g of a 14% solution of ammonium hydroxide. The final properties of the emulsion were as follows:

| | |
|---|---|
| Solids | 64.4% |
| Viscosity (60 rpm) | 720 cps at 25° C. |
| Accelerated Sed. | 1.0 |
| Tg | −5° C. |
| Grits (100 mesh) | 76 ppm |

This emulsion is identified as Run 13 in Table 1.

Runs 2–12 and 14–21 were performed following the procedure for Run 13 using as the stabilizer system the indicated polyvinyl alcohols and surfactant, if any, at the indicated levels (see Table 1). Run 1 represents a prior art vinyl acetate-ethylene copolymer emulsion used as a carpet backing adhesive in the industry.

TABLE 1

| RUN | POLYVINYL ALCOHOL - % of VAc | | SURFACTANT | Tg °C | EMULSION % SOLIDS | EMULSION VISCOSITY 60 rpm 25° C. | ACCEL. SED. | SBR COMPAT- IBILITY | COMPOUND VISCOSITY | |
|---|---|---|---|---|---|---|---|---|---|---|
| | | | | | | | | | 85% SOLIDS | 83% SOLIDS |
| 1 | VINOL 205:VINOL 523 (3:1) | 4.73% | NONE | −16 | 52 | 500 | 1.0 | NONE | UNSTABLE | SELECT WHITING |
| 2 | VINOL 205 | 4.73% | NONE | −14 | 59 | 790 | 2.5 | NONE | UNSTABLE | SELECT WHITING |
| 3 | VINOL 205:VINOL 523 (1:1) | 3.5 | NONE | −10 | 59 | 320 | 5.0 | NONE | — | STABLE |
| 4 | VINOL 205:VINOL 125 (1:1) | 3.5 | NONE | −14.5 | 56 | 170 | 5.0 | NONE | — | STABLE |
| 5 | VINOL 205:VINOL 107 (1:1) | 3.5 | IGEPAL CO-880 1% | −17 | 63 | 964 | 2.2 | PARTIAL | STABLE | STABLE |
| 6 | VINOL 205:VINOL 107 (1:1) | 3.5 | NONE | −10.5 | 62 | 572 | 2.5 | NONE | STABLE | STABLE |
| 7 | VINOL 205:VINOL 107 (1:1) | 3.5 | IGEPAL CO-880 2% | −15 | 64 | 664 | 0.7 | COMPLETE | STABLE | STABLE |
| 8 | VINOL 205:VINOL 107 (1:1) | 3.5 | IGEPAL CO-880 2% | −13 | 63 | 472 | 1.0 | COMPLETE | STABLE | STABLE |
| 9 | VINOL 205:VINOL 107 (1:1) | 3.5 | IGEPAL CO-880 2% | −5 | 65 | 530 | 1.0 | COMPLETE | STABLE | STABLE |
| 10 | VINOL 205:VINOL 107 (1:1) | 3.5 | IGEPAL CO-880 2% | −9.5 | 63 | 540 | 1.0 | COMPLETE | STABLE | STABLE |
| 11 | VINOL 205:VINOL 107 (1:1) | 3.5 | IGEPAL CO-880 2% | −11.5 | 62.5 | 682 | 1.5 | COMPLETE | STABLE | STABLE |
| 12 | VINOL 205:VINOL 107 (1:1) | 3.5 | IGEPAL CO-880 2% | −4 | 64 | 1100 | 2.0 | COMPLETE | STABLE | STABLE |
| 13 | VINOL 205:VINOL 107 (1:1) | 3.5 | IGEPAL CO-880 2% | −5 | 64.4 | 720 | 1.0 | COMPLETE | STABLE | STABLE |
| 14 | VINOL 205:VINOL 203 (1:1) | 3.5 | NONE | −9 | 62 | 800 | 1.0 | NONE | STABLE | STABLE |
| 15 | VINOL 205:VINOL 107 (1:1) | 3.5 | NONE | −12 | 63 | 688 | 2.5 | NONE | STABLE | STABLE |
| 16 | VINOL 205:VINOL 107 (1:1) | 3.5 | NONE | −12.5 | 62.5 | 980 | 5.5 | NONE | STABLE | STABLE |
| 17 | VINOL 205:VINOL 107 (1:1) | 3.5 | NONE | −15 | 62 | 578 | 5.0 | NONE | STABLE | STABLE |
| 18 | VINOL 205:VINOL 107 (1:1) | 3.5 | IGEPAL CO-880 1% | −14 | 62.5 | 600 | 4.0 | PARTIAL | STABLE | STABLE |
| 19 | VINOL 205:VINOL 107 (1:1) | 3.5 | IGEPAL CO-990 1% | −12 | 64 | 1028 | 1.5 | PARTIAL | STABLE | STABLE |
| 20 | VINOL 205:VINOL 107 (1:1) | 3.5 | IGEPAL CO-880 2% | −9 | 65 | 832 | 3.0 | COMPLETE | STABLE | STABLE |
| 21 | VINOL 205:VINOL 107 (1:1) | 3.5 | IGEPAL CO-880 2% | | 63 | 1548 | 5.2 | COMPLETE | STABLE | STABLE |
| | | | | | | | | 1.0 | | |

| | VINOL 107 | VINOL 125 | VINOL 203 | VINOL 205 | VINOL 523 | VINOL 540 |
|---|---|---|---|---|---|---|
| Hydrolysis (mole %) | 98–98.8 | 99.3+ | 87–89 | 87–89 | 87–89 | 87–89 |
| Viscosity* | 5–7 | 26–30 | 3–4 | 4–6 | 21–25 | 35–45 |
| Mol. Wt. | 17,000 | 58,000 | 12,000 | 25,000 | 60,000 | 90,000 |
| Dp | 400 | 1320 | 235 | 550 | 1250 | 1850 |

*4% aq. solution at 20° C.
Igepal CO-880 is a nonylphenoxy poly(ethyleneoxy)ethanol with HLB = 17.2
Igepal CO-990 is a nonylphenoxy poly(ethyleneoxy)ethanol with HLB = 19
VINOL is a trademark of Air Products and Chemicals, Inc. for polyvinyl alcohol.
IGEPAL is a registered trademark of GAF Corp.

It can be seen from the data in Table 1 that the combination of a fully hydrolyzed polyvinyl alcohol and a partially hydrolyzed polyvinyl alcohol in conjunction with a nonionic polyethoxylated surfactant yielded stable copolymer emulsions of 60–65% solids which were completely compatible with styrene-butadiene emulsions and could be compounded with fillers to a level of up to 85% solids or more to provide a stable carpet backing adhesive composition.

The emulsions of Runs 1–3 used the stabilizing system consisting of partially hydrolyzed polyvinyl alcohols without a surfactant and yielded products which did not exhibit styrene-butadiene rubber compatibility. Runs 1–2 were unstable at 85% solids. Runs 4 and 6 using a partially hydrolyzed and a fully hydrolyzed polyvinyl alcohol in the absence of a surfactant yielded an emulsion which was incompatible with styrene-butadiene emulsion.

Runs 5 and 7–13 show a stabilizer system of a fully hydrolyzed polyvinyl alcohol, a partially hydrolyzed polyvinyl alcohol and a nonionic polyethoxylated surfactant. The emulsions of Runs 7–13 were completely compatible with a styrene-butadiene rubber and when compounded at 83% and 85% solids afforded a stable composition. In these runs the surfactant level was 2 wt % of the vinyl acetate monomer. In Run 5 in which the surfactant level was 1 wt % there was partial compatibility with the styrene-butadiene rubber, i.e. there was some thickening.

EXAMPLE 2

In this example several copolymer emulsions of Example 1 were evaluated in a carpet backing composition.

Compounding evaluations set forth in Table 2 were done on a composition that contained 550 pph parts of Amical #1 Whiting calcium carbonate and was made at 83% total solids at a viscosity of 10–12,000 cps Brookfield Rvf, #5 Spindle at 20 rpm.

TABLE 2

| | Emulsion Run | | | | |
|---|---|---|---|---|---|
| | 7 | 8 | 9 | 10 | 11 |
| Water | 117 | 113 | 117 | 111 | 111 |
| A-149 | 2.7 | 2.7 | 2.7 | 2.7 | 2.7 |
| NH$_4$OH | 2.7 | 2.7 | 2.7 | 2.7 | 2.7 |
| Emulsion | 266 | 270 | 266 | 272 | 272 |
| Amical #1 | 935 | 935 | 935 | 935 | 935 |
| S. 238 | 1.7 | 1.7 | 1.7 | 1.7 | 1.7 |
| Para. 165 | 13 | 10 | 10 | 10 | 10 |
| Unth. Vis. | 2,700 | 2,950 | 2,500 | 3,450 | 3,000 |
| Viscosity | 11,600 | 11,200 | 12,100 | 11,000 | 12,200 |
| 24/hr. Comment | Slt. gel | Slt. gel | Slt. gel | Slt. gel | Slt. gel |
| 24/hr. Static | 17,000 | 16,200 | 16,400 | 15,800 | 17,400 |
| 24/hr. Stir | 11,050 | 10,000 | 11,000 | 10,200 | 10,600 |

All five vinyl acetate-ethylene copolymer emulsions (Runs 7–11) compounded equally well and the resulting compositions looked about the same after 24 hours. They were all about the same in unthickened viscosity, all responded about the same to thickener, all gelled slightly overnight and all had acceptable static viscosities after the gel broke. The gel was easily broken by shaking the containers.

The prior art vinyl acetate-ethylene copolymer emulsion of Run 1 was compared with the copolymer emulsion of Run 9 in Tables 3A and 3B, respectively, using four different fillers and two different thickeners at 83% total solids and 550 pph filler.

TABLE 3A

| | AMICAL #1 | D-70 | 350-D | WS-75 | AMICAL #1 | D-70 | 350-D | WS-75 |
|---|---|---|---|---|---|---|---|---|
| Water | 61 | 61 | 61 | 61 | 61 | 61 | 61 | 61 |
| A-149 | 2.7 | 2.7 | 2.7 | 2.7 | 2.7 | 2.7 | 2.7 | 2.7 |
| Run 1 Emulsion | 321 | 321 | 321 | 321 | 321 | 321 | 321 | 321 |
| Filler | 935 | 935 | 935 | 935 | 935 | 935 | 935 | 935 |
| S.238 | 1.7 | 1.7 | 1.7 | 1.7 | 1.7 | 1.7 | 1.7 | 1.7 |
| Para. 165 | 2.0 | 3.0 | 8.2 | 3.0 | — | — | — | — |
| Para. 2.0 | 3.0 | 9.0 | 2.0 | | | | | |
| Unth. Vis. | 7,800 | 6,900 | 2,800 | 8,000 | 7,800 | 6,700 | 2,725 | 10,000 |
| Vis. | 10,900 | 11,800 | 10,200 | 11,000 | 10,900 | 12,400 | 16,000 | 12,400 |
| 24/hr. Comment | Hard gel | Hard gel | Lt. gel | Lt. gel | Hard gel | Hard gel | Lt. gel | Lt. gel |
| 24/hr. Static | 45,000 | 47,500 | 25,000 | 32,500 | 48,000 | 48,000 | 35,000 | 35,000 |
| 24/hr. Stir | 11,000 | 11,200 | 10,800 | 11,600 | 10,800 | 13,000 | 19,400 | 13,600 |

TABLE 3B

| | AMICAL #1 | D-70 | 350-D | WS-75 | AMICAL #1 | D-70 | 350-D | WS-75 |
|---|---|---|---|---|---|---|---|---|
| Water | 117 | 117 | 117 | 117 | 117 | 117 | 117 | 117 |
| A-149 | 2.7 | 2.7 | 2.7 | 2.7 | 2.7 | 2.7 | 2.7 | 2.7 |
| NH$_4$OH | 2.7 | 2.7 | 2.7 | 2.7 | 2.7 | 2.7 | 2.7 | 2.7 |
| Run 9 Emulsion | 266 | 266 | 266 | 266 | 266 | 266 | 266 | 266 |
| Filler | 935 | 935 | 935 | 935 | 935 | 935 | 935 | 935 |
| S.238 | 1.7 | 1.7 | 1.7 | 1.7 | 1.7 | 1.7 | 1.7 | 1.7 |
| Para. 165 | 6.5 | 4.0 | 14.0 | 7.5 | — | — | — | — |
| Para. 156 | — | — | — | — | 7.0 | 5.0 | 15.0 | 8.5 |
| Unth. Vis. | 3,400 | 3,900 | 825 | 1,800 | 2,825 | 3,150 | 875 | 2,325 |
| Vis. | 9,600 | 9,400 | 9,200 | 9,200 | 9,000 | 14,000 | 10,600 | 10,200 |
| 24/hr. Comment | Lt. gel | Lt. gel | No gel | Lt. gel | Lt. gel | Lt. gel | No gel | Lt. gel |
| 24/hr. Static | 16,000 | 18,000 | 16,000 | 18,000 | 18,100 | 19,100 | 25,000 | 25,000 |
| 24/hr. Stir | 8,400 | 7,600 | 9,000 | 9,400 | 8,000 | 8,400 | 10,300 | 9,200 |

A-149 is Alcosperse 149 low molecular weight polyacrylate dispersant.
S238 is ammonium lauryl sulfate foam aid.
Paragum 156 is a polyacrylate thickener.
Paragum 165 is a polyacrylate thickener.

It can been seen from the data in Table 3A compared to 3B that Run 1 emulsion performed poorly in the adhesive compositions with all fillers and thickeners tested. The unthickened viscosity was too high in all formulations which indicated poor filler acceptance.

The 24 hour static viscosity was too high to be acceptable (difficult to move and transfer lines) and the thickener demand was so low it would be difficult to obtain the desired viscosity in a plant. On the other hand, the emulsion of Run 9, according to the invention, was acceptable with all fillers and thickeners in the formulations tested. The 24 hour static viscosity was high with 350-D and WS-75 (CaCO3) fillers and Paragum 156 thickener in contrast to the lower acceptable viscosities when these fillers were used with Paragum 165 thickener.

EXAMPLE 3

The emulsions according to the invention were again evaluated and compared to the prior art emulsion of Run 1 as well as two other prior art emulsions in carpet backing adhesive formulations. The data is presented in Table 4. Several of the emulsions according to the invention which were similarly prepared were combined and tested as one sample. It can be seen from the data that the unthickened viscosity of the samples containing the emulsions of the invention were significantly lower than that of the prior art emulsion Run 1. Accordingly, higher actual amounts of thickener had to be added to the emulsions of the invention.

Table 5 shows data for carpet backing adhesive formulations at 83% solids.

needed stability, decreases settling tendencies and also allows the emulsions to be compatible with styrene-butadiene emulsions. In addition, the surfactant helps to plasticize the polymer and allows the emulsions to have a higher Tg than the prior art vinyl acetate-ethylene copolymer emulsions but have the same "hand". The higher Tg prDducts have greater strength and water resistance. The use of the lower level of polyvinyl alcohol in combination with the surfactant leads to the preparation of stable emulsions at greater than 65% solids.

STATEMENT OF INDUSTRIAL APPLICATION

The invention provides a vinyl acetate-ethylene copolymer emulsion useful as a carpet backing adhesive which is formaldehyde-free, it can be compounded to 85% or more coating solids, is compatible with most grades of calcium carbonate, has styrene-butadiene emulsion compatibility, can be prepared at high emulsion solids, has improved water resistance and better strength.

I claim:

1. A carpet backing adhesive polymeric composition consisting essentially of 100 parts by weight of a vinyl acetate-ethylene copolymer emulsion, about 0.1 to 3 parts by weight dispersant, about 0.1 to 10 parts by weight thickening agent and between 400 and about 1000 parts by weight calcium carbonate, the vinyl ace-

TABLE 4

| RUN (All 80% Solids) | 1 | 20 & 21 | 6 & 15 | 16 & 17 | 5 & 18 | 14 | 19 |
|---|---|---|---|---|---|---|---|
| Wt. of Latex (g) | 340 | 286 | 295 | 290 | 288 | 290 | 281 |
| Ammonium Hydroxide (g) |  | 2.7 | 2.7 | 2.7 | 2.7 | 2.7 | 2.7 |
| Dispersant (A-149) (g) | 2.7 | 2.7 | 2.7 | 2.7 | 2.7 | 2.7 | 2.7 |
| Filler (WS-75) (g) | 765 | 765 | 765 | 765 | 765 | 765 | 765 |
| Froth Agent (S-238) (g) | 1.8 | 1.8 | 1.8 | 1.8 | 1.8 | 1.8 | 1.8 |
| Thickener (P-156) (g) | 14 | 14 | 14 | 14 | 14 | 14 | 14 |
| Unthickened Visc. (cps) | 1,700 | 550 | 550 | 550 | 475 | 700 | 500 |
| Thickener (Actual) (g) | 8 | 28 | 27 | 20 | 30 | 25 | 26 |
| Final Viscosity (cps) | 13,000 | 12,000 | 13,200 | 12,500 | 13,000 | 14,200 | 12,200 |
| 24 hr Static Viscosity (cps) | 27,500 | 17,500 | 18,500 | 17,500 | 22,500 | 28,000 | 19,000 |
| 24 hr Stirred Viscosity (cps) | 12,200 | 11,600 | 14,600 | 12,000 | 15,000 | 16,200 | 13,000 |
| Dry Delamination (lbs/in) | | | | | | | |
| 1 |  | 3.1 | 1.7 | 4.4 | 2.7 | 3.1 | 2.2 | 2.5 |
| 2 |  | 2.6 | 2.6 | 3.5 | 3.1 | 3.1 | 2.3 | 2.5 |
| x |  | 2.85 | 2.15 | 3.95 | 2.90 | 3.10 | 2.25 | 2.50 |
| Wet Delamination (lbs/in) | | | | | | | |
| 1 |  | 0.5 | 0.5 | 0.5 | 0.3 | 0.4 | 0.2 | 0.6 |
| 2 |  | 0.3 | 0.5 | 0.4 | 0.4 | 0.5 | 0.3 | 0.5 |
| x |  | 0.4 | 0.5 | 0.45 | 0.35 | 0.45 | 0.25 | 0.55 |
| Delta Delamination (%) (wet loss) | −86.0 | −76.7 | −88.6 | −87.9 | −85.5 | −88.9 | −78.0 |
| Tuft Bind | 14.1 | 15.0 | 15.4 | 16.7 | 14.4 | 14.6 | 16.9 |

TABLE 5

| RUN (All 83% Solids) | 6 & 15 | 6 & 15 | 20 & 21 | 20 & 21 | 16 & 17 | 16 & 17 |
|---|---|---|---|---|---|---|
| Wt. of Latex (g) | 295 | 295 | 286 | 286 | 290 | 290 |
| Ammonium Hydroxide (g) | 2.7 | 2.7 | 2.7 | 2.7 | 2.7 | 2.7 |
| Dispersant (A-149) (g) | 2.7 | 2.7* | 2.7 | 2.7* | 2.7 | 2.7* |
| Filler (WS-75) (g) | 765 | 765 | 765 | 765 | 765 | 765 |
| Froth Agent (S-238) (g) | 1.8 | 1.8 | 1.8 | 1.8 | 1.8 | 1.8 |
| Thickener (P-156) (g) | 14 | 14 | 14 | 14 | 14 | 14 |
| Unthickened Visc. (cps) | 4,800 | 5,200 | 2,150 | 2,150 | 3,200 | 3,200 |
| Thickener (Actual) (g) | 4 | 4 | 11 | 14 | 3 | 3 |
| Final Viscosity (cps) | 14,400 | 16,000 | 12,000 | 13,000 | 14,600 | 12,600 |
| 24 hr Static Viscosity (cps) | 12,000 | 27,000 | 17,000 | 23,000 | 16,500 | 22,000 |
| 24 hr Stirred Viscosity (cps) | 13,800 | 14,800 | 11,000 | 11,700 | 12,800 | 11,000 |

*Amical #1

From the examples it can be seen that the addition of the two types of polyvinyl alcohol at lower overall levels helps to solve the filler acceptance of the emulsion and facilitates compounding to 83–85% solids levels with most grades of fillers (Whiting CaCO3). The addition of the nonionic surfactant gives the emulsions tate-ethylene copolymer emulsion comprising an aqueous colloidal dispersion of a copolymer containing 65 to 90 wt % vinyl acetate and 10 to 35 wt % ethylene prepared by the emulsion polymerization of the monomers in the presence of 4 to 8 wt %, based on vinyl acetate, of a stabilizing system consisting essentially of a fully (98 to 99+ mole %) hydrolyzed polyvinyl alcohol, a partially (86 to 90 mole %) hydrolyzed polyvinyl alcohol, the polyvinyl alcohols present at 3 to 5 wt % and in a weight ratio ranging from 3:1 to 1:3, and 1 to 3 wt % of an alkyl phenoxy (polyethyleneoxy) ethanol.

2. The adhesive polymeric composition of claim 1 in which the weight ratio of fully hydrolyzed polyvinyl alcohol to partially hydrolyzed polyvinyl alcohol is about 1:1.

3. The adhesive polymeric composition of claim 1 in which the copolymer contains 85 to 90 wt % vinyl acetate and 10 to 15 wt % ethylene.

4. The adhesive polymeric composition of claim 1 which is at least about 85% solids.

5. The adhesive polymeric composition of claim 1 in which the partially hydrolyzed polyvinyl alcohol is 86–88 mole % hydrolyzed.

6. The adhesive polymeric composition of claim 1 in which the fully and partially hydrolyzed polyvinyl alcohols have a degree of polymerization ranging from 100 to 600.

7. The adhesive polymeric composition of claim 1 in which the alkylphenoxy (polyethyleneoxy) ethanol is nonylphenoxy (polyethyleneoxy) ethanol.

8. The adhesive polymeric composition of claim 7 in which the nonylphenoxy (polyethyleneoxy) ethanol has an HLB value of about 17.2.

9. In a carpet backing adhesive polymeric composition comprising a vinyl acetate-ethylene copolymer emulsion, dispersant, thickening agent and calcium carbonate filler, the improvement which comprises a vinyl acetate-ethylene copolymer emulsion consisting essentially of an aqueous colloidal dispersion of a copolymer containing 85 to 90 wt % vinyl acetate and 10 to 15 wt % ethylene prepared by the emulsion polymerization of the monomers in the presence of 4 to 8 wt %, based on vinyl acetate, of a stabilizing system consisting essentially of a fully (98 to 99+ mole %) hydrolyzed polyvinyl alcohol, a partially (86 to 88 mole %) hydrolyzed polyvinyl alcohol, the polyvinyl alcohols present at 3 to 5 wt % and in a 3:1 to 1:3 weight ratio, and 1 to 3 wt % of a nonylphenoxy (polyethyleneoxy) ethanol.

10. The adhesive polymeric composition of claim 9 in which the weight ratio of fully hydrolyzed polyvinyl alcohol to partially hydrolyzed polyvinyl alcohol is about 1:1.

11. The adhesive polymeric composition of claim 9 which is at least about 85% solids.

12. The adhesive polymeric composition of claim 10 which is at least about 85% solids.

* * * * *